United States Patent
Shun et al.

[11] Patent Number: 6,127,061
[45] Date of Patent: Oct. 3, 2000

[54] CATALYTIC AIR CATHODE FOR AIR-METAL BATTERIES

[75] Inventors: You-Keung Shun, South Shanghai; Chou-Lui Lou, Shenzhen, both of China

[73] Assignee: High-Density Energy, Inc., Azusa, Calif.

[21] Appl. No.: 09/238,008

[22] Filed: Jan. 26, 1999

[51] Int. Cl.[7] .................................................. H01M 4/86
[52] U.S. Cl. ................... 429/40; 429/42; 429/44; 429/27; 429/59; 429/133; 429/162; 429/163; 429/164; 429/165
[58] Field of Search ........................... 429/42, 40, 44, 429/27, 12, 59, 133, 162, 163, 164, 165; 204/282, 283, 290 R

[56] References Cited

U.S. PATENT DOCUMENTS

| | | | |
|---|---|---|---|
| 3,912,538 | 10/1975 | Dews et al. | 136/86 D |
| 4,007,059 | 2/1977 | Witherspoon et al. | 429/9 |
| 4,009,230 | 2/1977 | Smorenburg | 261/148 |
| 4,091,175 | 5/1978 | Höhne | 429/40 |
| 4,137,371 | 1/1979 | Blanchart et al. | 429/29 |
| 4,248,682 | 2/1981 | Lindstrom et al. | 204/114 |
| 4,262,062 | 4/1981 | Zatsky | 429/27 |
| 4,279,979 | 7/1981 | Benson et al. | 429/254 |
| 4,328,287 | 5/1982 | Sammells et al. | 429/15 |
| 4,377,496 | 3/1983 | Solomon | 252/425.3 |
| 4,407,907 | 10/1983 | Takamura et al. | 429/42 |
| 4,524,114 | 6/1985 | Samuels et al. | 429/42 |
| 4,562,124 | 12/1985 | Ruka | 429/30 |
| 4,842,963 | 6/1989 | Ross, Jr. | 429/21 |
| 4,894,296 | 1/1990 | Borbely et al. | 429/27 |
| 4,927,718 | 5/1990 | Ross, Jr. | 429/44 |
| 4,957,826 | 9/1990 | Cheiky | 429/27 |
| 5,092,976 | 3/1992 | Hossain et al. | 204/27 |
| 5,143,804 | 9/1992 | McArthur et al. | 429/148 |
| 5,306,579 | 4/1994 | Shepard, Jr. et al. | 429/40 |
| 5,308,711 | 5/1994 | Passaniti et al. | 429/29 |
| 5,342,704 | 8/1994 | Vasilow et al. | 429/31 |
| 5,360,680 | 11/1994 | Goldman et al. | 429/27 |
| 5,378,562 | 1/1995 | Passaniti et al. | 429/224 |
| 5,405,713 | 4/1995 | Pecherer et al. | 429/49 |
| 5,432,022 | 7/1995 | Cheiky | 429/27 |
| 5,445,901 | 8/1995 | Korall et al. | 429/27 |
| 5,453,330 | 9/1995 | Kawasaki et al. | 429/30 |
| 5,487,955 | 1/1996 | Korall et al. | 429/26 |
| 5,645,611 | 7/1997 | Ekern et al. | 29/623.2 |
| 5,665,481 | 9/1997 | Shuster et al. | 429/27 |
| 5,733,676 | 3/1998 | Dopp et al. | 429/27 |

*Primary Examiner*—Bruce F. Bell
*Attorney, Agent, or Firm*—Jones, Day, Reavis & Pogue

[57] ABSTRACT

An air cathode for use in an electrochemical cell or battery having an air permeable and water impermeable layer, an electrically conductive middle layer and a catalytic layer comprising a mixture of carbon particles, particulate materials, having a high surface area, metal hydroxides, and hydrophobic particles.

59 Claims, 6 Drawing Sheets

CATALYTIC AIR CATHODE FOR AIR-METAL BATTERIES

BACKGROUND OF THE INVENTION

1. Field of the Invention

This invention relates to electrochemical cells in general and more particularly to an improved air cathode used in metal-air batteries.

2. Description of Related Art Including Information Disclosed Under 37 CFR 1.97 and 1.98

Metal-air batteries, such as zinc air batteries offer the advantage of very high energy densities over non-conventional batteries such as alkaline, nickel, lithium ion, cadmium and other high density batteries. Zinc air batteries can be manufactured on a commercial production basis at low cost with a high degree of safety. Rechargeable zinc batteries suitable for use in automotive applications as the primary power source use a liquid electrolyte and often include a pump to recirculate the electrolyte. Such systems are impractical for miniature consumer applications ranging from radios to portable computers because of the mechanical complexity and other problems.

There have been several attempts to build batteries for small or miniature applications, such as illustrated in U.S. Pat. No. 4,957,826 issued to Michael C. Cheiky on Sep. 18, 1990. The Cheiky patent discloses a zinc anode plate completely wrapped in an absorbent cloth anode separator containing liquid electrolyte. A hydrogel material packed in an inert mesh separator is sandwiched between the wrapped anode and an air cathode. The gel material is sufficiently permeable to oxygen, to allow oxygen flow therethrough during charging and discharging cycles of the batteries, and provides chemical reactive communication to the air cathode and the electrolyte in the anode separator without allowing electrolyte to pass therethrough. The permeability of the gel material is selected, such that during charging of the battery, oxygen generated by the anode exerts sufficient pressure at the interface of the anode separator and gel material to cause electrolyte to be recirculated through the edges of the cloth anode separator to the opposite layer thereof, thereby preventing depletion of electrolyte to the anode. The battery of the Cheiky invention uses a metal powder or paste such as zinc in a semi-permeable foam, packed in an electrically conducted mesh screen to form an anode. A more recent metal-air cell similar to that disclosed in U.S. Pat. No. 4,957,826 to Cheiky is disclosed in U.S. Pat. No. 5,306,579 to Shepard Inc., et al. This patent discussed a bifunctional air-electrode having an active layer with an oxygen reduction catalyst and an oxygen evolution catalyst so as to provide a larger number of charge-discharge cycles.

Another U.S. patent by Sammells, et al., U.S. Pat. No. 4,328,287 discloses an air-metal battery cell having a porous electrode through which is passed a colloid of an oxidizable gas and electrolyte. The cell may be a primary cell with a anode-electrode comprising consumable metals, such as zinc. Electrolyte is supplied to a colloid-forming region in the cell by electrolyte supply means, which includes an electrolyte recycle pump means and electrolyte treating means for removing reaction products from the electrolyte and suitably treating the electrolyte for recycling through a distributor and manifold to the colloid-forming region of the cell.

Air-metal cells are well known in the art and generally comprise a consumable metal anode, a catalytic non-consumable oxygen consuming cathode, and a suitable electrolyte. Some of these primary fuel cells are multi-cell batteries with replaceable anodes. Other types of air-metal cells include those which are manufactured in the form of miniature button cells for hearing aids and alike. The typical zinc-air button cell generally includes: a cathode having at least one air port for the entrance of air and which contains a non-consumable air cathode structure usually comprising a gas permeable hydrophobic polymer film onto which is bonded a metal current collection grid and a waterproofed porous catalyst material, such as metal catalyzed active carbon mixed with a hydrophobic binder. The button cell also includes an anode container or can which is joined to the cathode typically by crimping and which includes a zinc anode mass, typically in the form of amalgamated zinc powder, or a porous zinc which is compacted and saturated with alkaline electrolyte, such as 30 to 40% aqua solution of KOH. The battery will also include an insulator between the cathode and anode, typically made of polyethylene, polypropylene, nylon, and the like, which can function as an electrolyte seal. A typical mixture button cell is disclosed in U.S. Pat. No. 5,308,711 issued to Passaniti, et al. The patent also discloses an air cathode.

Air-metal batteries such as zinc-oxygen cells had been used as a power source for electric vehicles and the like, because they provide high energy density relative to other cell chemistries. Zinc-oxygen cells have also been found suitable because they may be recharged by mechanically replacing the zinc electrode, by replacing the liquid electrolyte which contains zinc particles or by electro-mechanically replenishing zinc to the anode while also making available a fresh oxygen supply.

U.S. Pat. No. 4,009,230 teaches an air-zinc batteries having air passages through an active carbon cathode which is surrounded by gelled electrolyte. U.S. Pat. No. 4,137,371 describes a zinc-oxygen cell having a zinc electrode, and an oxygen porous diffusion cathode with a zincate ion diffusion restricting membrane joined directly to the oxygen electrode between the porous layer of this electrode and the zinc electrode. This is for purposes of preventing poisoning of electrochemically active material by zincate ions.

Another U.S. Pat. No. 5,445,901, issued to Korall, et al. on Aug. 29, 1995, discloses a multi-cell sealed zinc-oxygen battery comprising a container containing a plurality of bi-cells, each cell having a housing provided with two major surfaces and accommodating a pair of oppositely disposed space-apart air permeable, liquid impermeable cathodes in the form of oxygen reduction electrodes, and defining between them a cavity configured to accommodate an anode of the battery and electrolyte.

From the above discussion it is seen that air-metal batteries or cells come in many forms and sizes and have been found to provide an effective way to provide portable electrical power to a wide range of devices from electrical automobiles to miniature hearing aids. Of course, of utmost importance to each of these different types of batteries or cells is an effective and efficient air-cathode.

Much of the earlier prior art related to air cathodes used porous carbon or graphite, which, unfortunately is inherently structurally too weak to be used in thickness much below ⅛th inch. Electrodes based on rigid, relatively thick porous carbon plate or blocks, have also been studied extensively with emphasis on the effect of pore diameter, on gas permeability and electrode performance. Beside being bulky, these thick plates are not uniformly porous.

Thin porous carbon paper based electrodes, such as disclosed in U.S. Pat. No. 3,912,538, solves the bulk problem and has a shortened diffusion path. Unfortunately, thin porous carbon paper substrates are very fragile, and they are subject to excessive flooding with electrolyte which interferes with the access of the gas to the electro catalytic sites of the electrodes. To control the flooding, the carbon papers are often rendered hydrophobic by means of, for example, a Teflon coating which increases their electrical resistivity. In addition, because they are structurally weak, they tend to break in handling, as well as when they operate under moderate gas pressures. Finally, the wet-proofed carbon papers have to be dense to provide a minimum of structural integrity. This characteristic confines a catalytic layer to a surface coating bonded merely to one face of the paper substrate, and being paper, they are inherently nonuniform with respect to porosity. Another thin electrolytic gas diffusion electrode comprises a substantially uniform, open pore carbon or graphite substrate, having a thickness in the range to about 5 to 40 mils, and preferably about 10 to about 35 mils and includes a mixture of Teflon or similar wet-proofing particles and catalytic carbon particles imbedded and added within the cloth pores. This type electrode has improved electrochemical performances as well as improve structural strength and is suitable for use in free-flowing electrolytic electrochemical cells. The catalytic carbon particles are either metal-free catalytic carbon particles or finely divided high surface area carbons carrying suitable known noble metal catalytic particles, including platinum, palladium, radium, iridium, ruthenium, and silver, depending on the environment (e.g., acid or alkaline, air or hydrogen, and on operating conditions: temperature, current density and intended length of service).

Suitable substrates are open pore uniform woven cloths made with carbonization at high temperatures of prewoven carbonation fabrics. The carbon content of the cloth should be in excess of 97% by weight and preferably at least 99% by weight to avoid an undesirable impurity interaction with the electrolyte.

Still another U.S. Pat. No. 4,248,682, issued to Linstrum, et al., on Feb. 3, 1991, discloses thin gas diffusion electrodes comprising open pore carbon cloth substrates, provided with the uniform mixture of catalytic carbon particles and preferably Teflon particles adhered within the cloth pores and to the yarns of the cloth, thereby forming an electrode assembly with a plurality of closely spaced, preferably noble metal current collecting contacts. Such a diffusion electrode is typically used in electrochemical cells, including metal-air batteries and zinc electro cells and the like operating at high current densities. According to the U.S. Pat. No. 4,248,682 patent, an electrically conducting thin carbon cloth is coated with catalytic carbon particles mixed in Teflon or other hydrophobic binder, such that they adhere within the cloth openings or pores. Silver current carrying ribbons are interwoven within the cloth to provide current collection throughout the area of the cloth. Although silver is described in the patent, gold and platinum or other noble metals could be used.

U.S. Pat. No. 4,091,175 issued to Höhne of Germany discloses an air electrode for electrochemical cells using silver coated carbon as a catalytic material. The catalytic material disclosed in this patent also contains nickel hydroxide of up to 2% by weight.

A gas diffusion electrode and process is disclosed in U.S. Pat. No. 4,377,496 issued to Solomon. This patent is directed to an oxygen electrode having a conductive porous contacting sintered plaque metal substitute having site depression on the active layer contacting surface. The active layer may use catalyzed carbon particles which interlock with the site depressions. Also included is a hydrophobic backing such as PTFE (polytetrafluoroethylene).

Still another U.S. Pat. No. 4,407,907 issued to Takamura, et al., discloses an air-electrode comprising an electrode body which accelerates the reaction at the microscopic three phase interface of diffused air, the solid electrode body and the electrolyte. The oxygen concentration at the three phase interface is increased by using a fluorine containing solvent in the solid electrode body to improve the water repellant properties of the electrode body.

U.S. Pat. No. 4,927,718 discloses a carbonaceous electrode support material formed by heat treated carbon black material to a temperature above 2500° C. in an inert atmosphere. The support material is then shaped and formed into a catalyst support and then a catalytically active material is added.

U.S. Pat. No. 5,306,579 to Shepard, et al., discussed earlier with respect to batteries discloses a "bifunctional" air-electrode having an oxygen reduction catalyst and an oxygen evolution catalyst so as to increase the number of available charge discharge cycles.

Another U.S. Pat. No. 5,308,711 to Passaniti also discussed earlier discloses an air cathode using manganese compounds as a catalysts which are distributed throughout a carbon matrix. Manganese compounds of valence state +2 form between carbon particles after the carbon particles are added to an aqueous solution of potassium permanganate.

SUMMARY OF THE INVENTION

Therefore, it is the object of the present invention to provide a low cost air cathode for use in electrochemical cells and batteries having improved power density.

It is another object of the present invention to provide a metal air cell having increased service life.

It is a still further object of the present invention to provide a metal air cell having high current density with a steady current and voltage output.

These and other objects are achieved by the present invention of a gas/air cathode for use in an electrochemical cell. The cathode comprises an air permeable and water impermeable portion or layer formed of a matrix of carbon particles, such as for example carbon fibers or graphite, and hydrophobic particles such as for example PTFE (polytetrafluoroethylene), polyethylene, polypropylene, and polystyrene. An adhesive may be used to bond the matrix together into an appropriate structure. Adjacent the air permeable and water impermeable portion, is an electrically conductive middle structure such as for example a copper or nickel mesh or other electrically conductive structure which provides sufficient passages through the conductive portion to allow a free flow of air and oxygen. A catalytic portion is located on the opposite side of the electrically conductive structure from the air permeable portion and is comprised of a mixture of carbon particles such as carbon fibers or graphite, a particulate material having a high surface area such as molecular sieves, zeolite, activated carbon, or other suitable material. Also included in the mixture making up the catalytic portion is a metal hydroxide such as nickel hydroxide, cobalt hydroxide, iron hydroxide, cerium hydroxide, manganese hydroxide, lanthanum hydroxide, chromium hydroxide, or other suitable metal hydroxides. An adhesive is typically included with this mixture of the catalytic layer to bond the particles together to form a usable structure.

The basic concept of the unique air-cathode of this invention is suitable for a variety of different types of electrochemical cells and batteries, ranging from very large and complex batteries used for automobiles, boat motors, and other high powered demand devices down to small miniature button batteries typically used in tiny electronic devices such as hearing aids, watches, etc.

According to one embodiment of the invention there is also included a third electrode which serves as the cathode (in lieu of the air-cathode) during a recharging cycle. In addition, to assure the even regrowth of zinc or other anode metal, still another embodiment of the invention includes apparatus, such as a small motor, to rotate or otherwise move the metal anode during the recharging cycle.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

The unique and novel air cathode of this invention allows the manufacturer of electrochemical cells and batteries which can generate a much higher power density and efficiency with a steady state of voltage and current output than presently available metal-air batteries. As will be appreciated by those skilled in the art, metal-air batteries such as zinc-air batteries are already known as having a very high energy content. The efficiency and high power density output now possible with the air-cathode of the present invention makes the cells and batteries even more attractive. Tests have shown that batteries and cells produced with the new air-cathode of this invention may have a useful life when under load significantly greater than that of presently available metal-air batteries of equal volume and weight. The fact that this dramatic increase in performance is achieved with inexpensive readily available materials, many of which are already used extensive in electrochemical cell and battery industries, means many applications and uses are now possible at low manufacturing costs which simply were impossible or impractical with presently available electrochemical cells and batteries.

Also, of course, many types of metal-air batteries or electrochemical cells using an air-cathode use oxygen found in the atmosphere (i.e. air) as a consumable material. This means that there is no air pollution and consequently batteries and cells incorporating the novel air-cathode of this invention offer attractive possibilities for alternate energy generation which can replace some of the present day energy generation methods which add significant pollution to the air.

Figure 1A:
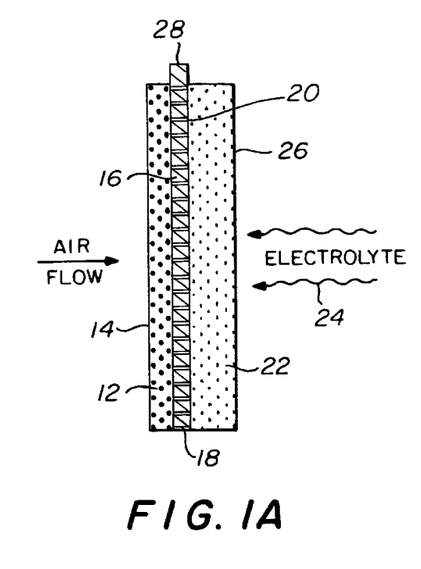
FIG. 1A is an enlarged cross section of an air cathode incorporating the concepts of the present invention.

Referring now to FIG. 1A, there is shown generally at 10 the air-cathode of the present invention. The catalytic air-cathode includes an outer portion or more specifically layer 12 which has a first surface 14 exposed to a flow of pure oxygen or other gas containing oxygen such as for example normal everyday air. As will be discussed in more detail hereinafter, the primary characteristics of the outer portion or layer 12 is that it is highly air or oxygen permeable, yet also highly water impermeable such that a liquid from the inside of the battery could not find its way to the exterior surface 14 of layer 12. Outer layer 12 also offers capacitance for storage of electrons when the air-cathode is used in a electrochemical cell or a battery. Laminated to surface 16 of layer 12 is an electron conductor and a current collector or conductive structure 18. Structure 18 may be any suitable, highly conductive material which has sufficient passageways therethrough to allow the air or oxygen flow coming from layer 12 to also pass through structure 18. Bonded to conductive structure 18 at juncture 20 is catalytic portion, or as shown in the embodiment of FIG. 1A, catalytic layer 22. Catalytic layer 22 is exposed to the free-air or oxygen flow through portion 12 and electrically conductive structure 18 on one side and electrolyte material indicated by wavy arrow 24 at its other side (inner-surface 26). Catalytic portion 22 provides locations for a multi-phased catalytic reaction necessary to generate the electric current of a battery.

A particularly suitable outer portion or layer 12 of cathode 10 is made of a mixture of carbon particles, such as graphite or carbon fibers, and hydrophobic particles, such as those made from polymers such as PTFE (polytetrafluoroethylene), polyethylene, polypropylene, and polystyrene or any other material which provides the necessary hydrophobic characteristics without interfering with the electrochemical reaction required of the cathode. The ratio of carbon particles to hydrophobic particles should be from about 50:1 to about 3:1. An optimal ratio seems to be between about 9:1–6:1. An adhesive such as epoxy is preferably used to bond the mixture of particles together into a suitable structure for use as a cathode. As was mentioned earlier, the electrically conductive structure 18 may be made of any suitable material which can be fabricated in a sheet form and provide high electrical conductivity without interfering in the electrochemical reaction necessary for the cell or battery. Copper, nickel mesh, or electroplated nickel on copper and preferably having a mesh size of 20 to 40, has been found to be particularly suitable for use as the electrically conductive layer. Other suitable electrically conductive layers may be brass or copper honeycomb cores or even a row of individual conductive metal wires running from the interior of the cathode to an exterior terminal 28.

The inner portion or layer such as catalytic portion 22 is preferably made up of a mixture of carbon particles, such as carbon fibers or graphite, a particulate material having a high surface area, such as activated carbon, molecular sieves, zeolite, or any other material having a high surface area, metal hydroxide and hydrophobic particles. It is important, of course, that the high surface area particulate material not interfere with the electrochemical reaction necessary for the electrochemical cell or battery and that it is not be adversely affected by the electrolyte which is typically a high alkaline electrolyte potassium hydroxide solution. Graphite or carbon fibers act as a conductive filler in the catalytic portion or layer for providing a bridge or pathway to allow electrons to transfer from the metal mesh through the non-conductive particulate matter having a high surface area. The high surface area particulate matter, such as the activated carbon, zeolite, molecular sieves, and the like will provide a significant interface contact area for the catalytic reactions as will be discussed hereinafter. Substantially every metal hydroxide tested to date has been found to be effective at increasing the electrochemical reaction and consequently the efficiency of an electrochemical cell or battery. Metal hydroxides particularly effective include nickel hydroxide, cobalt hydroxide, iron hydroxide, manganese hydroxide, lanthanum hydroxide, chromium hydroxide, and cerium hydroxide. The mixture making up the catalytic portion or layer also includes hydrophobic particles, such as PTFE and other hydrophobic particles mentioned heretofore. These hydrophobic particles help inhibit the infusion of water under hydrostatic pressure and capillary attraction to help maintain the appropriate environment for the electrochemical reactions to take place. Whereas a particular suitable ratio of graphite, molecular sieves, wetted metal hydroxides, and PTFE of about 5:2:4:0.2 gives an optimized performance, it has been found that the graphite should not be less than 10% or more than 90%, the molecular sieve should not be less than 5% or more than 70%, the wetted metal hydroxide should not be less than 5% or more than 70%, and the hydrophobic particles or PTFE should not be less than 1% or more than 30%.

It will also be appreciated that it may be appropriate to add an adhesive such as epoxy to help bond the particles of the catalytic portion or layer 22 together.

Figure 1B:
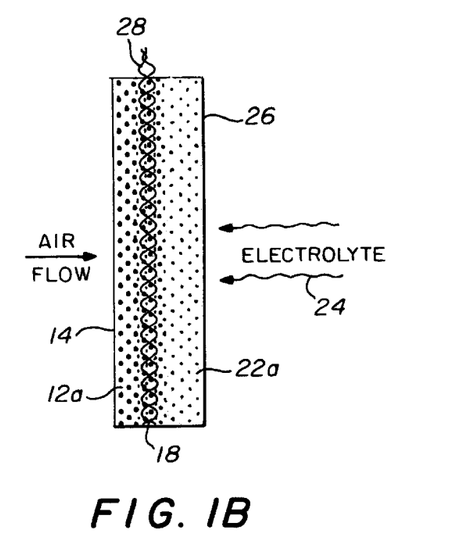
FIG. 1B is an enlarged cross section of another embodiment of an air cathode incorporating the concepts of this invention.

Referring now to FIG. 1B, there is shown another embodiment of the air cathode of the present invention wherein there is no clear delineation of an air preamble, water impermeable portion 12a and a catalytic portion 22a such as is shown in FIG. 1A. As shown, in FIG. 1B, there is a gradual change from the air permeable, water impermeable portion 12a to the catalytic portion 22a. The conductive structure 18 (shown as a metal mesh in FIG. 1B) is located at a point in the air cathode about midway between the change from the air permeable, water impermeable portion 12a and the catalytic portion 22a.

Figure 2A:
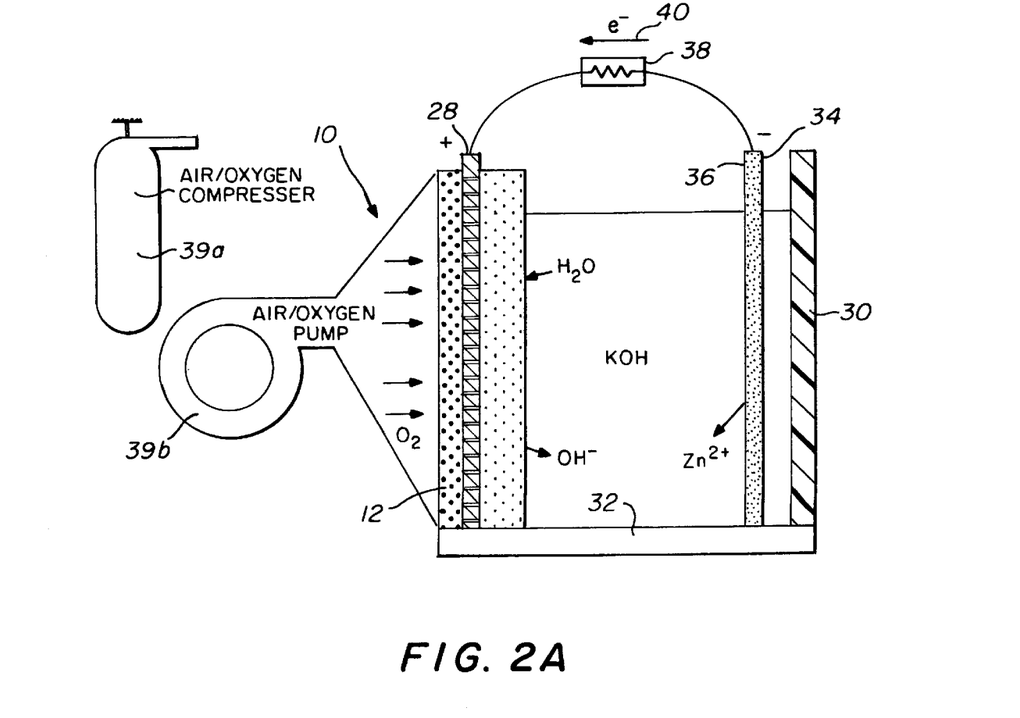
FIG. 2A is a cross sectional, simplified diagrammatic view of the air cathode of FIG. 1 used in a metal-air battery.

Thus there has been described to this point novel and unique air-cathodes which gives significantly improved performance over presently available air-cathodes. The air-cathode as discussed is suitable for use in various types of electrochemical cells or batteries. For example, in FIG. 2 there is shown a cross sectional and simplified diagrammatic view of the air-cathode embodiment of FIG. 1A used in an air zinc type battery with KOH (potassium hydroxide) as a liquid electrolyte. It will be appreciated of course that the embodiment of FIG. 1B could also be used. As shown, in addition to the air-cathode 10, the zinc-air battery includes a case wall and bottom, 30 and 32 respectively, typically made out of a material that is non-reactive with a highly alkaline liquid electrolyte and which will not interfere in the electrochemical reactions necessary for the performance of the battery. The case walls, such as case walls 30 and 32 and two walls not shown, along with the air electrode 10 provide a container for holding the liquid electrolyte KOH 24. Also, as shown, is a zinc anode 34 of the type typically used in zinc-air batteries. It will be appreciated that although the battery as shown in FIG. 2 is with respect to the air-cathode and a zinc plate anode 34, suitable anodes made of other, metal materials such as iron, cadmium, copper, and aluminum may also be used. As shown in FIG. 2, positive terminal 28 of the air-cathode 10 is electrically connected to a load 38 which may be any device requiring electrical power and in turn is electrically connected to terminal 36 of the anode plate 34. As will be appreciated by those skilled in the art, current is typically portrayed as flowing from a positive terminal 28 to a negative terminal 36. However, the flow of electrons is opposite that of the traditional accepted current flow direction. This distinction is made at this point to aid in the understanding of the electrochemical reactions discussed in the following paragraphs.

It will be appreciated that the core of the catalytic air-electrode lies in the inner layer or the catalytic layer 22. This is where the multi-phased catalytic reactions occur and the electrical current is generated. That is, this is the location where the air, water, and solids exist and the reactions happen. When under load, electrons flow from the zinc plate terminal 36 through the load 38 to terminal 28 on the electric conductive layer 18 of the catalytic air electrode 10. The electrons then flow from the electrical conductive layer 18 or metal mesh to the catalytic sites which are located on the high surface area particulate matter. The flow of air or oxygen is through the carbon particles or graphite of the outer layer 12, and the hydrophobic particles PTFE, pass the electric conductive layer 18 and to the catalytic sites such that the reaction can take place.

It will also be appreciated by those skilled in the art, and as will be discussed in more detail later, that the electric current or electron flow occurs in an air-cathode battery as a result of oxidation of the metal anode. Therefore, as shown in FIG. 2, a pump 39 may be provided to increase the pressure of the air or oxygen flow to the cathode. Of course, even though air/oxygen pump 39b is shown, any kind of pump, fan, or other technique for increasing the air or oxygen pressure to the air cathode may be used including a cylinder of compressed air or oxygen as indicated by cylinder 39a. Tests have shown that there is a noticeable increase in the battery performance as the pressure of the air or oxygen to the cathode is increased.

As was discussed earlier, substantially any metal hydroxide has been found to increase the performance of electrochemical cells or batteries using the air-cathode of this invention. The chemical equations for the electrochemical reactions, when using an iron hydroxide are set out below as an example only.

As shown in Equation 1 below:

$$4Fe(OH)_3 + 4e^- \rightleftharpoons 4Fe(OH)_2 + 4OH^- \qquad 1)$$

the high valance metal hydroxide captures electrons transferred from the graphite and metal mesh and is reduced to a low valance metal hydroxide. Subsequently, the low valance metal hydroxide reacts with the oxygen from the outside air flowing through the outer layer and water from the electrolyte such that the metal hydroxide moves back to the high valance state. This is shown in Equation 2 below.

$$4Fe(OH)_2 + O_2 + 2H_2O \approx 4Fe(OH)_3 \qquad (2)$$

Thus, during this process the water is consumed and the hydroxide root (OH⁻) is generated. The overall resulting reaction is shown in Equation 3 below.

$$O_2 + 2H_2O + 4e^- \approx 4OH^- \qquad (3)$$

It will be appreciated, that water from the electrolyte will continuously move into the catalytic layer to supplement the water being consumed and at the same time, the hydroxide root (OH⁻) will continuously move out of the catalytic layer into the electrolyte toward the zinc plate. Thus at the anode of the electrochemical cell or battery, the reactions as shown in Equations 4 and 5 below take place.

$$2Zn^{2+} + 4OH^- \approx 2Zn(OH)_2 \qquad (4)$$

$$2Zn(OH)_2 \approx 2ZnO + 2H_2O \qquad (5)$$

Also taking place at the zinc place is the reaction shown in Equation 6 below.

$$2Zn \approx 2Zn^{2+} + 4e^- \qquad (6)$$

Such that the total reaction is such as shown in Equation 7 below.

$$O_2 + 2Zn \approx 2ZnO$$

Thus, there has been described to this point novel and new air cathodes and the electrochemical reactions which provide the increased performance.

Figure 2B:
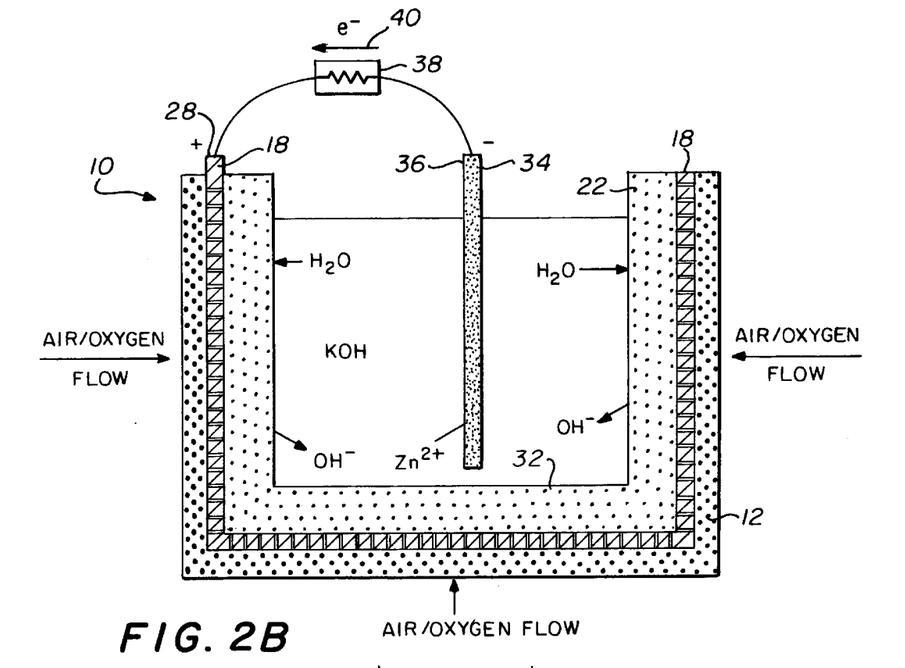
FIG. 2B shows a cross sectional diagrammatical view of a metal air battery having the air-cathode of this invention on at least three sides surrounding the metal anode.

As will be appreciated by those skilled in the art, to assure sufficient surface area for the air cathode of this invention, it may be desirable for the cathode(s) to partially surround the metal anode as is shown in FIG. 2B. At least two sides and the bottom of the battery comprising air cathodes of this invention are shown in FIG. 2B. It is also possible of course that the other two sides and the top of the battery could also be air cathodes.

Figure 2C:
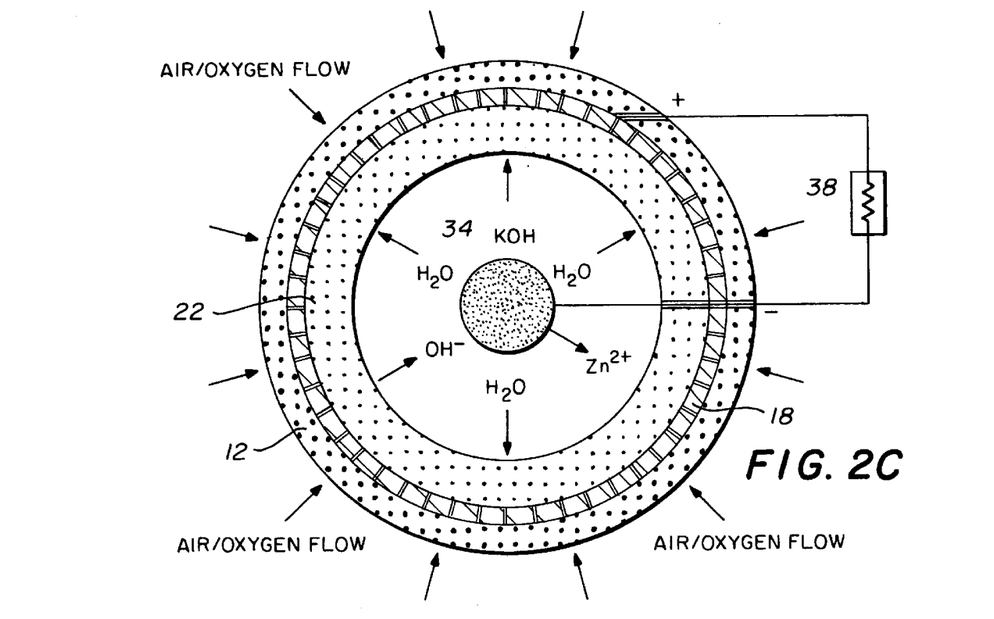
FIG. 2C shows a cross sectional diagrammatical view of a spherical shaped metal air battery having the air-cathode on the outside and surrounding the metal anode.

FIG. 2C illustrates a spherical shaped air cathode completely surrounding the metal anode and the electrolyte.

As will also be appreciated by those skilled in the art, there are a variety of different types of air-metal batteries, some include liquid electrolytes; others include wet slurries, etc. These different types of batteries are also used in many different applications, including very small button-type batteries for watches and small electronic components, as well as large systems used in automobiles which even include pumps to pump the electrolyte.

Figures 3, 4:
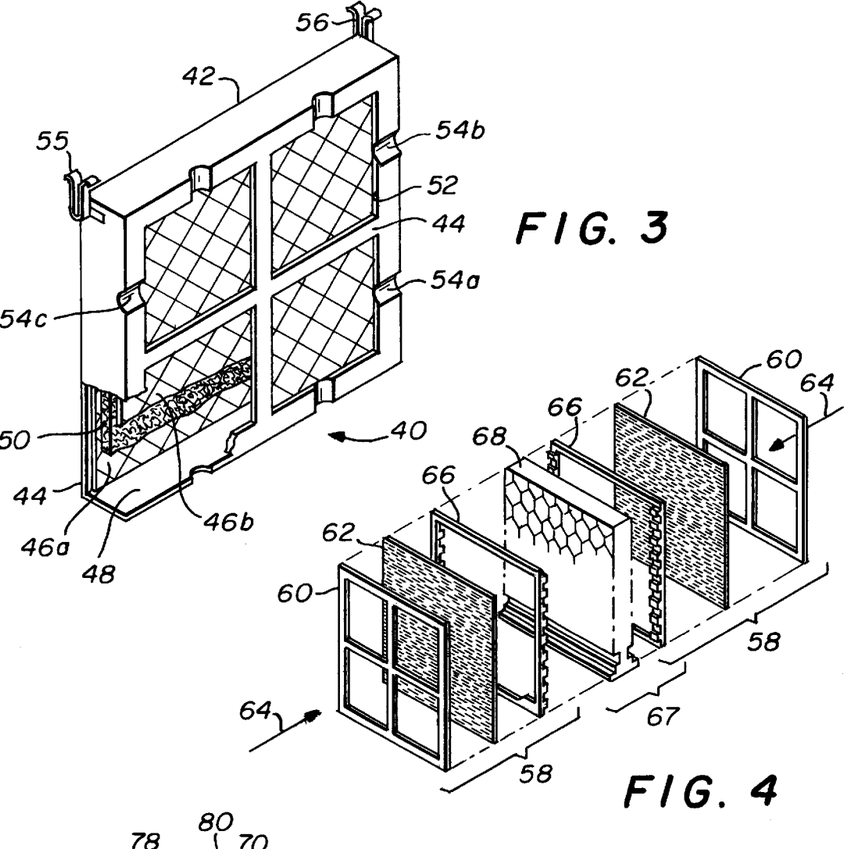
FIG. 3 shows a partial cross sectional perspective view of a bi-cell having two air cathodes of FIG. 1 and a single anode suitable for being stacked to form a multi-cell battery.
FIG. 4 is an exploded view of another embodiment of a bi-cell suitable for being stacked to form a multi-cell battery and incorporated a pair of air cathodes of FIG. 1.

Referring now to FIG. 3, there is shown one cell which may typically be placed in parallel or series with a plurality of other cells in a container. The cell is a bi-cell 40 and includes a housing 42, having two major surfaces 44 which accommodate a pair of oppositely disposed, spaced apart, air permeable, liquid impermeable cathodes 46a and 46b, which are in the form of oxygen reduction electrodes and make up the subject matter of the present invention.

The cathode 46a and 46b defined between them a cavity 48, configured to accommodate an anode 50 and electrolyte (not shown), such as an aqueous KOH solution.

Substantial portions of the major surfaces 44 are removed, thus exposing major portions of the oxygen-reducing cathodes, such that the oxygen or air supplied to the bi-cell 40 is able to reach and react with the cathodes 46a and 46b.

The major surfaces 44 are partly recessed in such a way as to form in conjunction with a similarly recessed outer surface of a major surface of an adjacent cell housing a cathode gas space 52 between adjacent bi-cells 40. A plurality of oxygen access openings 54a, 54b & 54c leads to the gas space 52. Cell terminals 55 and 56 allow power connections.

Referring now to FIG. 4, there is shown a multi-cell, rechargeable, metal air battery containing a slurry of active metal anode particles, in an electrolytic solution, which is suitable for powering an electrical vehicle. A plurality of these cells are connected and placed in a container for holding the electrolyte solution.

The zinc-air battery cell, employ a slurry containing a mixture of zinc particles in a suitable electrolyte solution, such as KOH.

As shown, there is illustrated a single battery cell having a pair of outer electrode unit 58. Each outer electrode unit 58 includes an outer support frame 60 and an air electrode/gas electrode 62 which represents the subject matter of the present invention. Air electrode 62 is oriented such that the air flow is through the outer layer (such as layer 14 shown in FIG. 1) as indicated by arrow 64 with the catalytic layer of the cathode to the inside. There is also an inner support frame 66 similar to the outer support frame 60. The outer electrode units 58 are supported so as to define an interior space 67 for storing a slurry, preferably in the form of active metal particles saturated with a suitable electrolyte solution. The slurry of active metal particles are supported by the honeycomb structure of current collector 68 in the interior space 67 of the cell as a static bed saturated with electrolyte solution.

The center current collector 68 is mounted within the interior space 67 of the battery, so as to be surrounded by the saturated active metal particles.

Figure 5:
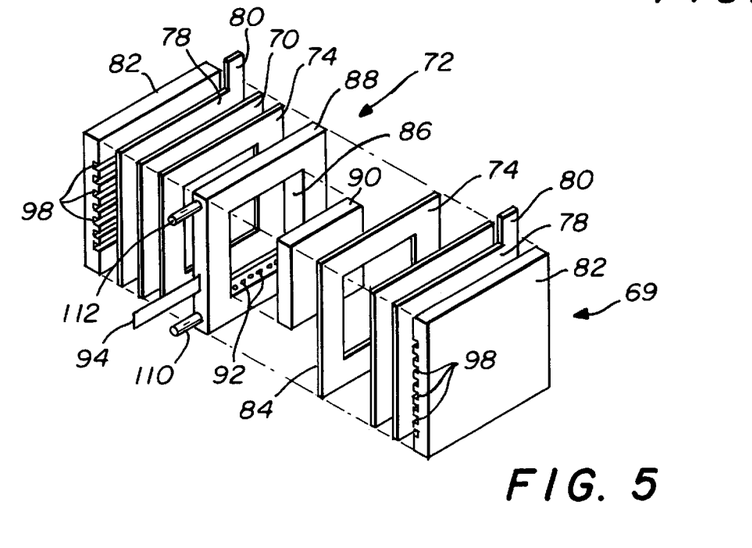
FIG. 5 shows an exploded view of yet another bi-cell using a pair of air cathodes of FIG. 1.
Figure 6:
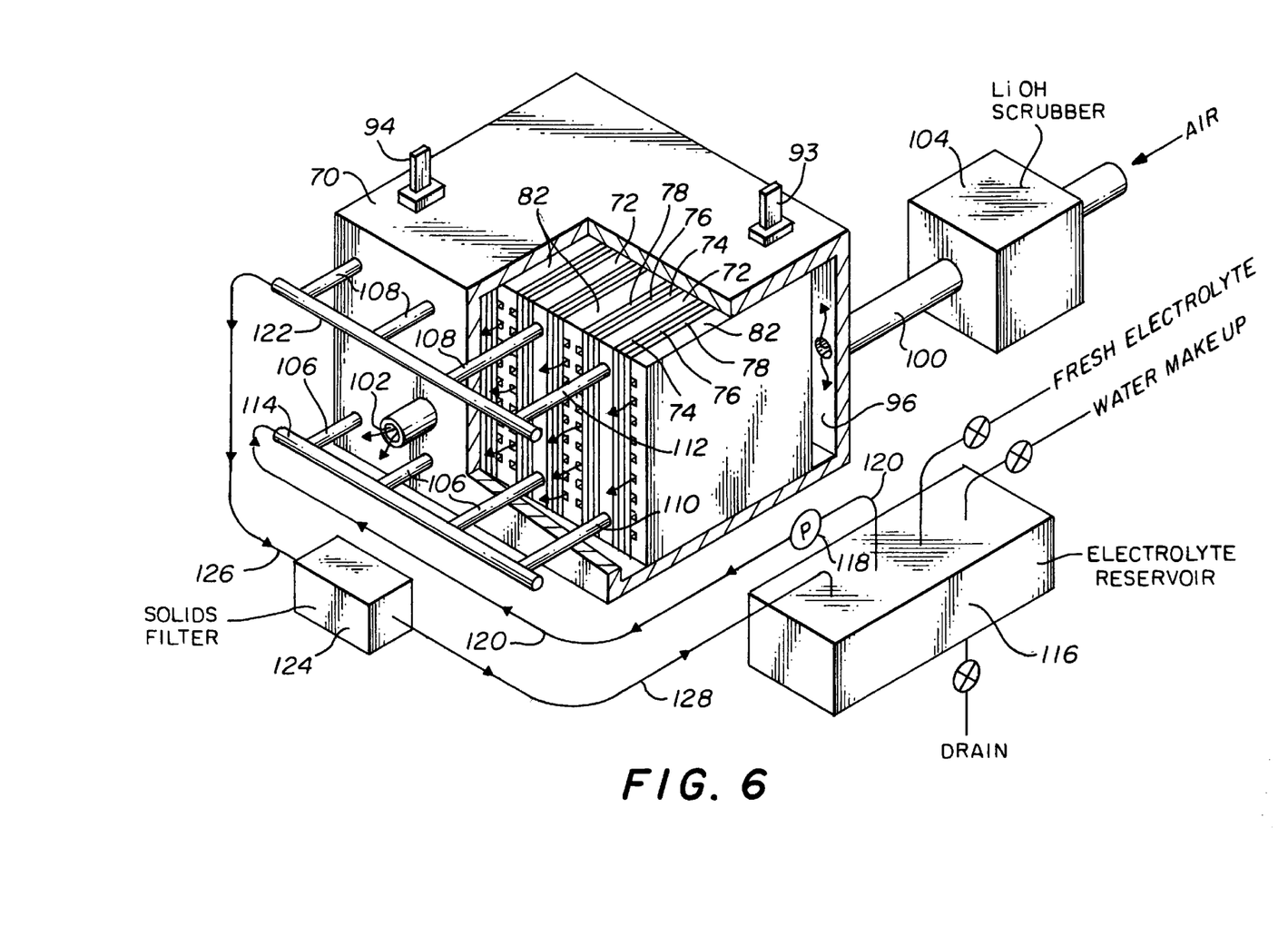
FIG. 6 shows the bi-cell of FIG. 5 used in an elaborate embodiment of a zinc-air battery.

Still another zinc-air cell 69 which can use the air-cathode of this invention is generally illustrated in FIGS. 5 and 6, which comprises a case 70, containing a zinc electrode structure indicated generally at 72, a gasket member 74, a porous separator 76, an air electrode 78, which constitutes the subject matter of this invention, having a conductive tab 80, and an air electrode backing plate 82. As shown in FIG. 4, a zinc air cell 69 will preferably comprise the air electrode 78 and accompanying gaskets 74, separators 76 and electrode backing plates 82 on each side of the zinc electrode structure 72.

Case 70 may comprise any structurally strong and chemically inert insulation material, such as, for example, a hard rubber case normally used for lead acid batteries. Any other customary non-conducted battery case material may be used in the construction of the case.

Gasket number 74 may be formed of general resilient electro elastomeric material, such as, for example, an ethylene-propylene copolymer of styrene butadiene polymer, which will be generally inert to the electrochemical reactions within the cell. Gasket 74 will be formed with the central opening 84, generally similar but slightly larger in cross section to opening 86 in zinc electrode frame 88 to permit communication to structure a zinc-impregnated electrically conductor foam 90 in electrode structure 72. Rectangular zinc electrode frame 88 may be formed from polypropylene, polyethylene, polytetrafluoroethylene or any other plastic material possessing sufficient mechanical strength and exhibiting chemical inertness to an alkaline electrolyte. Frame 88 supporting the zinc impregnated foam 90 is shown as having top and bottom molded sections with perforations bores 92. As shown, there is a cutout to form opening 86 in the frame 88. Porous foam material 90 is mounted in opening 86 so as to form a conductive support material for the zinc electrode. Porous foam material 90 may comprise a carbon foam or a metal foam. Metal foam shavings, such as, for example, copper or nickel foams are commercially available and preferably are plated with lead before used as zinc substrates. Any other type metal may be used, provided that the position of the electromotive series, with respect to zinc, is such that the oxidation reduction of the zinc in the electrode is not interfered with. Carbon foam material having high porosity surfaces are commercially available and may be preferred over metal foams in terms of weight because of low density, etc. To provide external electric contact to the electrode, a conductive metal tab 94 may be mounted in the sidewall of the frame 88 so as to extend in one direction to the sidewall of frame to electrically communicate with the foam 90 in opening 86.

Gasket 74 will be formed with a central opening 86 generally similar but slightly larger in cross-section than opening 86, of frame 88, to permit communication to the zinc impregnated foam 90 of electrode 72. The purpose of gasket 74 is to provide a seal between separator 76 and zinc electrode 72 to permit the alkaline electrolyte circulating within electrode 72 to wet the surface of separator 76 without permitting leakage of the electrolyte into the air space 96.

There is also an air electrode backing plate 82 comprising an insulation material, such as polypropylene or polytetrafluoroethylene which acts to space air electrode 78 from the sidewall of case 70 as well as to make the flow or oxygen of air to air electrode 78 through a series of grooves 98, molded into the side surface of the backplate 82, facing air electrode 78.

The electrolyte used in the cell or battery invention comprise an alkaline electrolyte having both high conductivity and high solubility for zincate ions. The best electrolytes are those based on concentrated KOH with additives that improve zincate solubility, for example, potassium silicate and sorbitol.

Referring now to the view of FIG. 6 which shows several of the zinc air cells just described sandwich together to form a multi cell battery, it will be noted that battery case 70 is provided with tubings 100 through which air may be admitted into the battery. The air which enters into space or plenum 96 between the inner surface of case 72 and the side wall of the cell members, reaches air electrodes 78 via grooves 98 in air electrodes backing plates 82 and then exits the battery through a exit port 102 in plenum 96 on the other side of the battery. The incoming air passes through a scrubber 104 which removes any carbon dioxide in the air. Scrubber 104 may comprise a lithium hydroxide scrubber or any other material capable of reacting with the carbon dioxide in the incoming air, such as for example calcium hydroxide, sodium hydroxide or mixtures of theses hydroxides, such as for example sodyl.

On the opposite side of the battery electrolyte inlet tubing 106 and outlet tubing 108 or provided through case 70 for passing electrolyte respectfully from inlet port 110 to outlet port 112 of each zinc electrode support structure 72. Inlet tubes 106 are connected to a manifold 114 through which electrolyte from an external reservoir 116 is pumped to the battery by a pump 118 through pipe 120. Outlet tubes 108 are connected to electrolyte outlet manifold 122 from the which the electrolyte passes into a solids filter 124, through pipe 126, which removes any solids for example carbonates in the electrolyte. The filtered electrolyte passes into reservoir 116 via pipe 128. The filtered material in solids filter 124 may comprise any material which is chemically inert to the alkaline electrolyte and capable of removing undesirable solids such as a fibrous porous foam of polytetrafluoroethylene.

Figure 7:
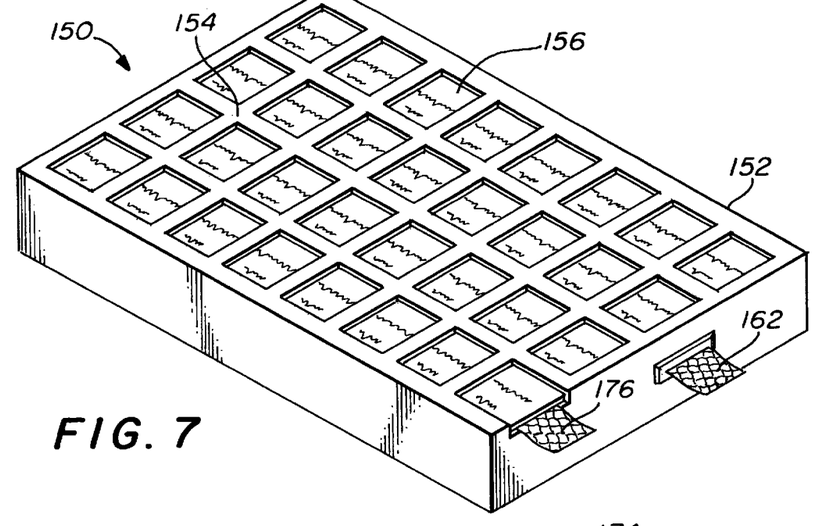
FIG. 7 and 8 are perspective and sectional views respectively of another cell embodiment incorporating the air cathode of FIG. 1.
Figure 8:
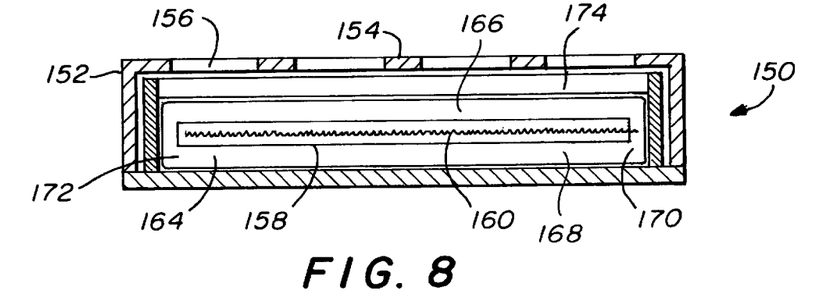

Still another type of battery which will benefit from the unique cathode of the present invention is a zinc-air battery such as described in FIGS. 7 and 8. As shown in FIGS. 7 and 8 rechargeable zinc-air battery, is designated by the reference number 150 and includes a casing or container 152 made of inert plastic or other suitable material. The top 154 of container 152 is formed with openings 156 which permit the flow of air into and out of the battery during charging and discharging cycles. The battery 150 further includes an anode 158, having an electrically perforated conductive plate or mesh screen 160 with a lead 162 extending outwardly from the conductive plate or mesh screen 160 to provide a positive terminal connection for the battery. The perforated conductive plate or mesh screen 160 may be formed of expanded metal or woven metal with a mesh size of 20 to 80 openings per inch. The material of the screen 160 may be iron, tin, titanium, or other non-corrosive metals or plating of these metals on an economical substrate. Of course, noble metal screens could be used but are expensive.

A porous layer of zinc material is packed into the mesh of the screen 160. The zinc material may be zinc powered flakes, granules, capsules or fibers packed to a semipermeable density. Corrosive inhibitors and paste forming additives may be added to the zinc material to improve the performance of the battery, if desired. Metals such as mercury, cadmium, tin, lead, gallium or indium provide corrosive inhibition. The metals may be a zinc alloy, or physically mixed with a zinc particles. Either the zinc, zinc alloys and/or the corrosive inhibiting metal can be coated or plated onto an inert substrate, such as sand, glass, ceramic, etc. The inhibitor metal is usually present in an amount from 0.1 to 10% by weight.

The anode 158 is completely wrapped in a porous anode separator 164, formed of absorbent, wettable, oxygen-resistant, woven or nonwoven cloth, such as cotton, rayon, and/or wettable plastic fibers. The anode separator 164 may also include inert spacer material. Suitable, wettable materials can be the same modified polymer material, such as carboxyl, modified polymers, or polysulfone polymers, and modified polymers can be mixed with polymers, such as polypropylene to enhance the structure, capillary or wicking action of the composite. A carboxymethyl cellulose polymer containing 15% polypropylene can be effectively used as the anode wrapping material in the battery. As viewed in FIG. 8, the anode separator 164 has a first or upper layer, 166, a second or lower layer 168, inside are edge layers 170 and 172 which interconnect the upper and lower layers 166 and 168. A liquid electrolyte required for operation of the battery is contained in the anode separator 164. Electrolyte may be a simple or mixed aqueous base, such as a group 1 metal hydroxide, such as LiOH, NaOH, KOH, $C_a$SOH, etc., in the range of one mole to saturation, usually about 1 to 15 moles.

The battery 150 also includes of course an air permeable cathode 174, which is the subject matter of this invention. The air-cathode 174 has a lead 176 extending outwardly therefrom to provide a negative terminal for the battery.

Figure 9:
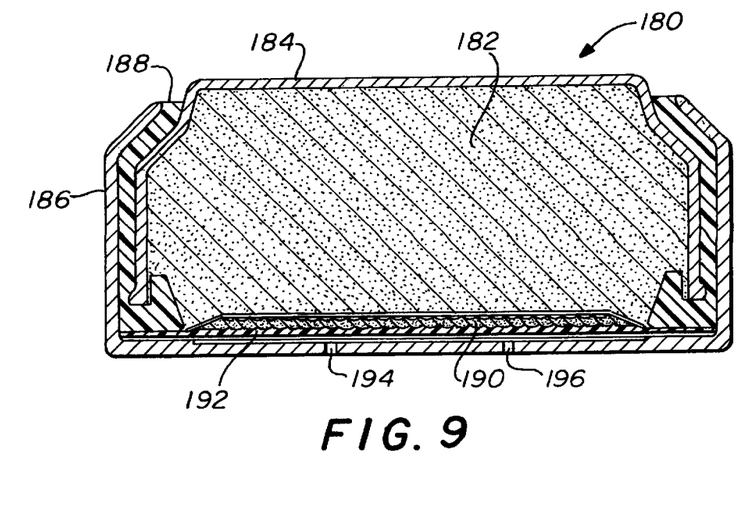
FIG. 9 is a sectional view of a miniature button cell battery incorporating the air electrode of FIG. 1.

Referring now to FIG. 9 there is shown a zinc-air button cell 180 in cross-section using the air cathode of this invention. Conventional elements include an anode 182 of compacted zinc or amalgamated zinc powder in an anode cup 184, a complementary lower cathode cup 186 having cylindrical side walls which are crimped around the anode cup 184. The two parts are sealed with an insulating grommet spacer 188. Also included is a multilayer separator 190 which may be a fibrous cellulose metal containing alkali KOH (potassium hydroxide). An air cathode 192 incorporating the teachings of this invention is supported on and makes electrical contact with cathode cup 186. The foregoing materials of construction are merely illustrative and not intended to be restrictive of the type of materials or construction used with a typical air-metal cell. As shown, the bottom cup 186 defines perforations 194 and 196 therein which serves as a plurality of air-flow passages.

The outer layer of cathode 192 (layer 12 in FIG. 1) is disposed so as to cover perforations 194 and 196 such that the outer layer 12 of its cathode and the perforation 194 and 196 control the flow of oxygen. The outer layer 12 is selected in the manner well known to those skilled in the art to provide the proper flow of oxygen to the catalytic layer cathode 192 so as to control the limiting current which may be drawn from the cell and its rated voltage.

Figure 10:
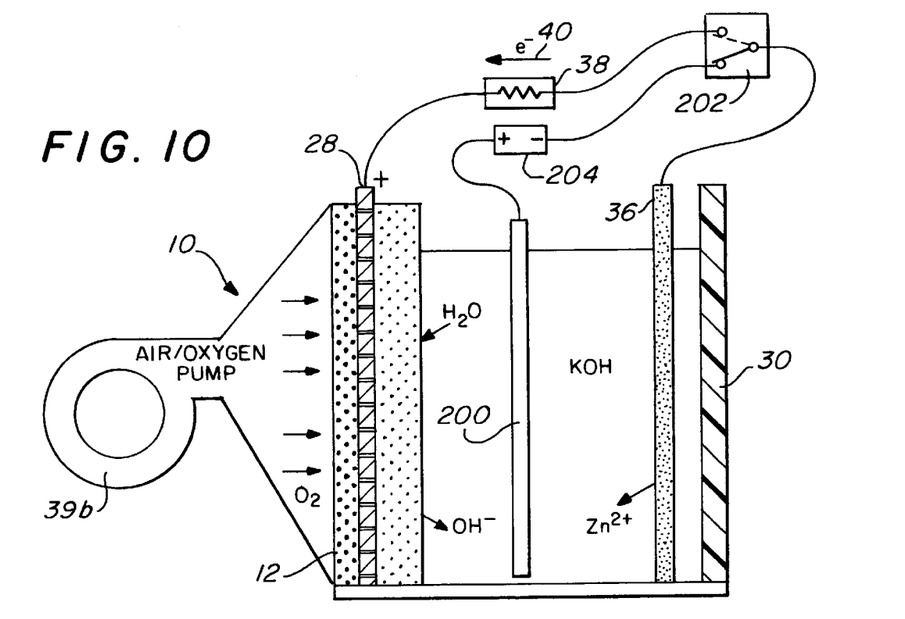
FIG. 10 shows an embodiment of the present invention including a third electrode.

Referring now to FIG. 10, there is shown an air-zinc type battery such as discussed with respect to FIGS. 2A, 2B, and 2C which includes a third or auxiliary electrode 200. This auxiliary electrode serves as a charging electrode and is made of a suitable inert and conductive material according to one embodiment, the third electrode 200 may be made of carbon fibers. Also as shown, the third or recharging electrode 200 is located in the battery case so as to be in contact with the electrolyte. During the recharging cycle, the load 38 between air-cathode 10 and anode 36 is disconnected such as by switch 202 shown for purposes of explanation only. In the embodiment shown, disconnecting load 38 by switch 202 results in power source 204 being connected between anode 36 and the auxiliary or recharging cathode 200. Thus, when power source 204 provides a voltage across charging cathode 200 and anode 36, the electron and current flow is reversed so as to recharge the battery. Recharging, of course, reverses the electrochemical reaction at the anode. This results in the anode metal such as zinc growing or being redeposited on metal anode 36 as is well understood by those skilled in the art.

Figure 11:
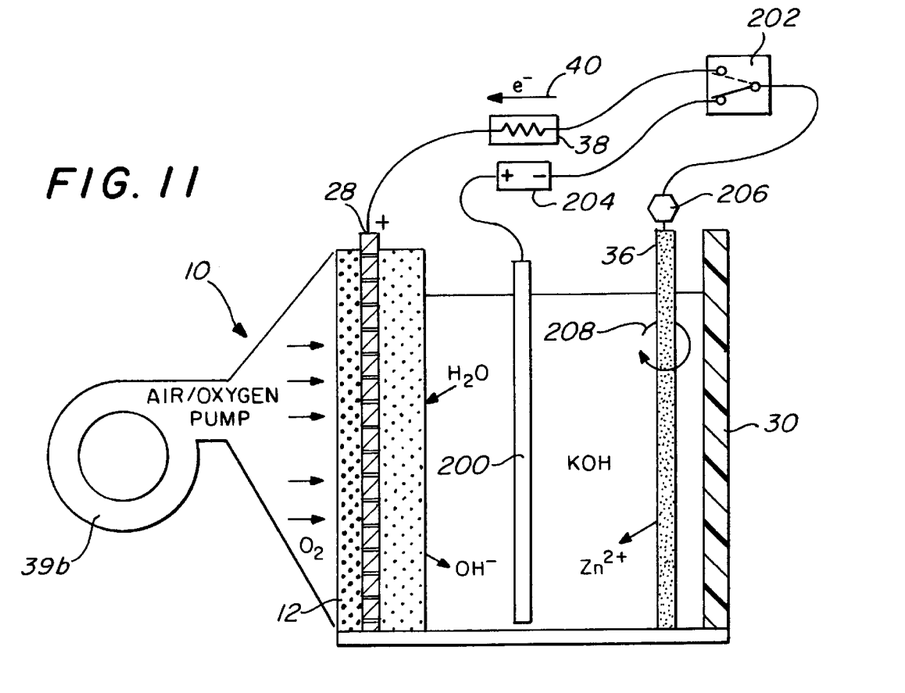
FIG. 11 shows an embodiment having a third electrode as in FIG. 10 and further including apparatus for rotating or otherwise moving the battery anode.

Still another embodiment is shown in FIG. 11 which also includes a third or recharging electrode 200. As shown, the embodiment of FIG. 11 is the same as that shown in FIG. 10, except it also includes apparatus 206 for slowly moving (preferably stirring or rotating anode 36). The apparatus 206 may simply be a very small motor connected to anode 36 to achieve rotation as indicated by arrow 208 or, alternatively, may be a solenoid connected so as to cause reciprocating motion as indicated by arrow 110. Slow movement of anode 36 such as rotational movement results in even redepositing or growth of the metal anode which in the embodiment of FIG. 11 is a zinc anode. This helps avoid bald spots on the anode or the formation of sharp metal spikes which could damage the battery.

The corresponding structures, materials, acts, and equivalents of all means or step plus function elements in the claims below are intended to include any structure, material, or act for performing the function in combination with other claimed elements as specifically claimed.

We claim:

1. A cathode for use in an electrochemical cell comprising:
   an air permeable and water-impermeable portion;
   a catalytic portion comprising a mixture of carbon particles, particulate material having a high surface area, a metal hydroxide, and hydrophobic particles; and
   an electrically conductive structure located between said air permeable and water impermeable portion and said catalytic portion, said electrically conductive structure defining sufficient passages to allow air to flow therethrough.

2. The cathode of claim 1 wherein said air permeable and water impermeable portion is a mixture of carbon particles and hydrophobic particles.

3. The cathode of claim 2 wherein said hydrophobic particles are polymers selected from the group consisting of PTFE (polytetrafluoroethylene), polyethylene, polypropylene, and polystyrene.

4. The cathode of claim 2 wherein said carbon particles are selected from the group of carbon fibers and graphite.

5. The cathode of claim 2 wherein said mixture of carbon particles and hydrophobic particles is between about 50:1 and about 3:1.

6. The cathode of claim 5 wherein said mixture ratio is between about 9:1 and 6:1.

7. The cathode of claim 5 wherein said carbon particles are graphite particles and the hydrophobic particles are PTFE bonded together with epoxy.

8. The cathode of claim 1 wherein said particulate material having a high surface area is selected from the group consisting of activated carbon, molecular sieves, and zeolite.

9. The cathode of claim 1 wherein said metal hydroxides are selected from the group consisting essentially of nickel hydroxide, cobalt hydroxide, iron hydroxide, cerium hydroxide, manganese hydroxide, lanthanum hydroxide, and chromium hydroxide.

10. The cathode of claim 1 wherein said electric conductive structure is a honeycomb structure made from a conductive metal.

11. The cathode of claim 1 wherein said electrically conductive structure is a mesh made from a conductive metal.

12. The cathode of claim 1 wherein said air permeable, water permeable portion is a layer bonded to one side of said electrically conductive structure and said catalytic portion is a layer bonded to the other side of said electrically conductive structure.

13. A metal-air battery comprising:
   a cathode comprising an air permeable and water impermeable portion, a catalytic layer comprising a mixture of carbon particles, particulate material having a high surface area, a metal hydroxide and hydrophobic particles, and an electrically conductive structure located between said air permeable and water permeable portion and said catalytic portion, said electrically conductive structure defining sufficient passages to allow air or oxygen to flow therethrough;
   a metal anode;
   an electrolyte in contact with said cathode and said anode; and
   a liquid impervious case to support said cathode, said anode and said electrolyte.

14. The metal-air battery of claim 13 wherein said air permeable and water impermeable portion of said air cathode is mixture of carbon particles and hydrophobic particles.

15. The metal-air battery of claim 14 wherein said mixture of carbon particles and hydrophobic particles is between about 50:1 and about 3:1.

16. The metal-air battery of claim 15 wherein said mixture ratio is between about 9:1 and about 6:1.

17. The cathode of claim 15 wherein said carbon particles are graphite particles and said hydrophobic particles are PTFE particles bonded together with epoxy.

18. The metal air battery of claim 13 wherein said electrolyte is about 25% to about 50% potassium hydroxide solution.

19. The metal air battery of claim 13 wherein said anode is a metal selected from the group consisting of zinc, iron, cadmium, copper, and aluminum.

20. The metal-air battery of claim 13 wherein said anode is made of zinc.

21. The metal air battery of claim 13 wherein said hydrophobic particles are polymers selected from the group consisting of PTFE (polytetrafluoroethylene), polyethylene, polypropylene, and polystyrene.

22. The metal air battery of claim 13 wherein said carbon particles are selected from the group of carbon fibers and graphite.

23. The metal air battery of claim 13 wherein said particulate material having a high surface area is selected from the group consisting of activated carbon, molecular sieves, and zeolite.

24. The metal air battery of claim 13 wherein said metal hydroxides are selected from the group consisting of nickel hydroxide, cobalt hydroxide, iron hydroxide, cerium hydroxide, manganese hydroxide, lanthanum hydroxide, and chromium hydroxide.

25. The metal air battery of claim 13 wherein said electrically conductive structure is mesh made from a conductive metal.

26. The metal air battery of claim 13 wherein said electric conductive structure is a honeycomb structure made from conductive metal.

27. The metal-air battery of claim 13 and further comprising an inert auxiliary electrode positioned within said case so as to be in contact with said electrolyte, said auxiliary electrode serving as the cathode for recharging said battery.

28. The metal air battery of claim 27 wherein said auxiliary electrode is made of carbon fibers.

29. The metal-air battery of claim 27 and further comprising a power source connected between said metal anode and said inert auxiliary electrode for recharging said metal-air battery.

30. The metal air battery of claim 27 and further comprising apparatus connected so as to move said metal anode to obtain even growth of metal on said anode during recharging.

31. The metal-air battery of claim 30 wherein said apparatus is a motor connected to rotate said anode.

32. The metal-air battery of claim 30 wherein said anode is a metal selected from the group consisting of zinc, iron, cadmium, copper, and aluminum.

33. The metal-air battery of claim 30 wherein said anode is zinc.

34. An electrochemical cell for providing electrical power comprising:
   a metal anode;
   a cathode structure comprising an air permeable and water impermeable portion, a catalytic portion comprising a mixture of carbon particles, particulate material having a high surface area, a metal hydroxide, and hydrophobic particles, said cathode structure oriented such that the catalytic portion faces said metal anode, and an electrically conductive structure defining sufficient passages to allow air to flow therethrough; and
   an electrolyte in contact with said cathode and said anode.

35. The electrochemical cell of claim 34 wherein said cathode structure is a substantially spherical structure enclosing said metal anode.

36. The electrochemical cell of claim 35 wherein said plurality of cathodes completely surround said metal anode.

37. The electrochemical cell of claim 34 wherein said cathode structure is a plurality of cathodes facing said metal anode.

38. The electrochemical cell of claim 34 wherein said air permeable and water impermeable portion of said air cathode is mixture of carbon particles and hydrophobic particles.

39. The electrochemical cell of claim 38 wherein said mixture of carbon particles and hydrophobic particles is between about 50:1 and about 3:1.

40. The electrochemical cell of claim 39 wherein said mixture ratio is between about 9:1 and about 6:1.

41. The electrochemical cell of claim 39 wherein said carbon particles are graphite particles and said hydrophobic particles are PTFE particles bonded together with epoxy.

42. The electrochemical cell of claim 34 and further comprising an inert auxiliary electrode positioned so as to be in contact with said electrolyte, said auxiliary electrode serving as the cathode for recharging said cell.

43. The electrochemical cell of claim 42 wherein said auxiliary electrode is made of carbon fibers.

44. The electrochemical cell of claim 43 said electrochemical cell comprising a power source connected between said metal anode and said inert auxiliary electrode for recharging said metal-air battery.

45. The electrochemical cell of claim 44 wherein said apparatus is a motor connected to rotate said anode.

46. The electrochemical cell of claim 43 further comprising apparatus connected so as to move said metal anode to obtain even growth of metal on said anode during recharging.

47. The electrochemical cell of claim 46 wherein said anode is a metal selected from the group consisting of zinc, iron, cadmium, copper, and aluminum.

48. The electrochemical cell of claim 46 wherein said anode is zinc.

49. A cathode for use in an electrochemical cell comprising:
   an air permeable and water-impermeable layer comprising a mixture of carbon particles and PTFE particles having a mixture ration of between about 9:1 and 6:1;
   a conductive metal mesh bonded on one side to said air permeable layer; and
   a catalytic layer bonded to the other side of said metal mesh comprising a mixture of about 5 parts graphite particles, about 2 parts of a particulate matter having a high surface area, about 4 parts of wet metal hydroxide, and about 0.2 parts of hydrophobic particles.

50. The cathode of claim 49 wherein said carbon particles are graphite particles.

51. The cathode of claim 49 wherein said carbon particles and said PTFE particles are bonded together with epoxy and the mixture ratio of carbon particles to PTFE particles is about 6:1.

52. A metal-air battery comprising:
   a cathode comprising an air permeable and water impermeable layer comprising a matrix of about 6 parts graphite particles and about 1 parts PTFE particles bonded together with epoxy, a conductive metal mesh bonded on one side to said air permeable, water impermeable layer and a catalytic layer bonded to the other side of said metal mesh comprising a mixture of about 5 parts graphite particles, about 2 parts of a particulate mater having a high surface area and about 4 parts of a wet metal hydroxide, and about 0.2 parts of PTFE particles;
   a metal anode selected from the group consists of zinc, iron, cadmium, copper, and aluminum;
   an electrolyte in contact with said cathode and said anode; and a liquid impervious case to support said cathode, said anode and said electrolyte.

53. The metal air battery of claim 52 and further comprising an inert auxiliary electrode positioned within said case so as to be in contact with said electrolyte, said auxiliary electrode serving as the cathode for recharging said battery.

54. The metal-air battery of claim 53 wherein said auxiliary electrode is made of carbon fibers.

55. The metal-air battery of claim 53 and further comprising a power source connected between said metal anode and said inert auxiliary electrode for recharging said metal-air battery.

56. The metal-air battery of claim 53 and further comprising apparatus connected so as to move said metal anode to obtain even growth of metal on said anode during recharging.

57. The metal-air battery of claim 56 wherein said apparatus is a motor connected to rotate said anode.

58. The metal-air battery of claim 56 wherein said anode is a metal selected from the group consisting of zinc, iron, cadmium, copper, and aluminum.

59. The metal-air battery of claim 56 wherein said anode is zinc.

* * * * *